United States Patent
Gilson

(10) Patent No.: US 11,991,340 B2
(45) Date of Patent: *May 21, 2024

(54) DYNAMIC DISTRIBUTION OF CONTENT

(71) Applicant: TIVO CORPORATION, San Jose, CA (US)

(72) Inventor: Ross Gilson, San Jose, CA (US)

(73) Assignee: TIVO CORPORATION, San Jose, CA (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/138,105

(22) Filed: Dec. 30, 2020

(65) Prior Publication Data

US 2021/0127106 A1 Apr. 29, 2021

Related U.S. Application Data

(63) Continuation of application No. 16/438,833, filed on Jun. 12, 2019, now Pat. No. 11,122,253, which is a
(Continued)

(51) Int. Cl.
*H04N 13/194* (2018.01)
*H04N 21/2343* (2011.01)
(Continued)

(52) U.S. Cl.
CPC ..... *H04N 13/194* (2018.05); *H04N 21/23439* (2013.01); *H04N 21/2365* (2013.01);
(Continued)

(58) Field of Classification Search
CPC ........... H04N 13/194; H04N 21/23439; H04N 21/2365; H04N 21/2385; H04N 21/2393;
(Continued)

(56) References Cited

U.S. PATENT DOCUMENTS

| | | | |
|---|---|---|---|
| 6,215,766 B1 * | 4/2001 | Ammar | H04N 21/4381 370/465 |
| 6,532,562 B1 * | 3/2003 | Chou | H04L 1/08 714/752 |

(Continued)

FOREIGN PATENT DOCUMENTS

| | | | | |
|---|---|---|---|---|
| EP | 2288170 A2 | 2/2011 | | |
| EP | 2408211 A1 * | 1/2012 | ......... | H04N 13/0048 |

(Continued)

OTHER PUBLICATIONS

Balsree, R., et al. "Clustering based Transcoding for Congestion Control in Wireless Networks." TENCON 2005-2005 IEEE Region 10 Conference. IEEE, 2005. (Year: 2005).*

(Continued)

*Primary Examiner* — Patrice L Winder
(74) *Attorney, Agent, or Firm* — Haley Guiliano LLP

(57) ABSTRACT

Methods, apparatuses, and software are disclosed for sending only a first video component (e.g., data comprising one of a left or right component) of content to a plurality of client devices. Further aspects provide for sending, responsive to a request from one of the plurality of client devices, both the first video component and a second video component (e.g., data comprising both of the left and right components) to one or more of the plurality of client devices.

20 Claims, 8 Drawing Sheets

Related U.S. Application Data continuation of application No. 15/208,113, filed on Jul. 12, 2016, now Pat. No. 10,368,052, which is a continuation of application No. 13/115,043, filed on May 24, 2011, now Pat. No. 9,420,259.

(51) Int. Cl.

| | |
|---|---|
| *H04N 21/2365* | (2011.01) |
| *H04N 21/2385* | (2011.01) |
| *H04N 21/239* | (2011.01) |
| *H04N 21/258* | (2011.01) |
| *H04N 21/437* | (2011.01) |
| *H04N 21/81* | (2011.01) |
| *H04N 21/462* | (2011.01) |

(52) U.S. Cl.
CPC ..... *H04N 21/2385* (2013.01); *H04N 21/2393* (2013.01); *H04N 21/25825* (2013.01); *H04N 21/437* (2013.01); *H04N 21/816* (2013.01); *H04N 21/4621* (2013.01)

(58) Field of Classification Search
CPC ........... H04N 21/25825; H04N 21/437; H04N 21/816; H04N 21/4621
See application file for complete search history.

(56) References Cited

U.S. PATENT DOCUMENTS

| | | | |
|---|---|---|---|
| 6,614,927 | B1 | 9/2003 | Tabata |
| 6,728,775 | B1* | 4/2004 | Chaddha ................ H04N 19/51 375/E7.092 |
| 7,558,870 | B2 | 7/2009 | Parker |
| 7,650,036 | B2 | 1/2010 | Lei et al. |
| 7,680,109 | B2 | 3/2010 | Lundin et al. |
| 7,760,659 | B2 | 7/2010 | Luo et al. |
| 8,483,269 | B2 | 7/2013 | Kim et al. |
| 8,538,234 | B2 | 9/2013 | Ogawa et al. |
| 8,542,622 | B2 | 9/2013 | Wu et al. |
| 8,629,899 | B2 | 1/2014 | Raveendran et al. |
| 8,635,359 | B2 | 1/2014 | Fröjdh et al. |
| 8,676,041 | B2 | 3/2014 | Tourapis et al. |
| 8,687,046 | B2 | 4/2014 | Yu et al. |
| 8,704,873 | B2 | 4/2014 | Yamagishi et al. |
| 8,752,100 | B2 | 6/2014 | Ramakrishnan et al. |
| 8,810,630 | B2 | 8/2014 | Kim et al. |
| 8,854,428 | B2 | 10/2014 | Suh et al. |
| 8,854,434 | B2 | 10/2014 | Saito et al. |
| 8,878,912 | B2 | 11/2014 | Raveendran et al. |
| 9,013,546 | B2 | 4/2015 | Karaoguz et al. |
| 9,032,470 | B2 | 5/2015 | Meuninck et al. |
| 9,041,772 | B2 | 5/2015 | Suh et al. |
| 9,137,523 | B2 | 9/2015 | Jun et al. |
| 2002/0056095 | A1 | 5/2002 | Uehara et al. |
| 2003/0236902 | A1 | 12/2003 | Weiss et al. |
| 2008/0205791 | A1 | 8/2008 | Ideses et al. |
| 2009/0066785 | A1 | 3/2009 | Lee |
| 2009/0168680 | A1 | 7/2009 | Singh et al. |
| 2010/0095005 | A1* | 4/2010 | Le Lann ................ H04L 65/80 709/226 |
| 2010/0250764 | A1* | 9/2010 | Vare ..................... H04N 21/435 709/231 |
| 2010/0309202 | A1 | 12/2010 | Watanabe |
| 2010/0309287 | A1 | 12/2010 | Rodriguez |
| 2010/0329328 | A1* | 12/2010 | Kontola ............ H04N 21/4383 375/E7.078 |
| 2011/0012992 | A1 | 1/2011 | Luthra et al. |
| 2011/0026608 | A1 | 2/2011 | Luthra |
| 2011/0032328 | A1 | 2/2011 | Raveendran et al. |
| 2011/0032338 | A1 | 2/2011 | Raveendran et al. |
| 2011/0063410 | A1* | 3/2011 | Robert ................. H04N 13/178 348/E13.001 |
| 2011/0063411 | A1 | 3/2011 | Kitazato |
| 2011/0074934 | A1 | 3/2011 | Ko et al. |
| 2011/0085023 | A1 | 4/2011 | Hulyalkar et al. |
| 2011/0090970 | A1 | 4/2011 | Kim et al. |
| 2011/0099285 | A1 | 4/2011 | Yamagishi et al. |
| 2011/0102544 | A1 | 5/2011 | Kim |
| 2011/0164111 | A1 | 7/2011 | Karaoguz et al. |
| 2011/0176616 | A1 | 7/2011 | Luthra et al. |
| 2011/0274179 | A1* | 11/2011 | Holden .............. H04N 21/6587 375/E7.076 |
| 2011/0298803 | A1 | 12/2011 | King et al. |
| 2012/0023155 | A1* | 1/2012 | Myers ................... H04L 65/612 709/203 |
| 2012/0033034 | A1 | 2/2012 | Otsuka et al. |
| 2012/0033039 | A1 | 2/2012 | Sasaki et al. |
| 2012/0042047 | A1 | 2/2012 | Chen et al. |
| 2012/0075418 | A1 | 3/2012 | Kim et al. |
| 2012/0075436 | A1 | 3/2012 | Chen et al. |
| 2012/0124633 | A1* | 5/2012 | Lu ........................... H04L 65/80 725/114 |
| 2012/0229604 | A1 | 9/2012 | Boyce et al. |

FOREIGN PATENT DOCUMENTS

| | | | | |
|---|---|---|---|---|
| WO | | 2007047736 | A2 | 4/2007 |
| WO | WO-2007131527 | A1 * | 11/2007 | .......... H04L 12/185 |
| WO | | 2011008917 | A1 | 1/2011 |

OTHER PUBLICATIONS

Zhang, Kexin, et al. "Video broadcast system based on scalable video coding (SVC)." 2010 3rd International Conference on Computer Science and Information Technology. vol. 4. IEEE, 2010. (Year: 2010).*
Goktug Gurler et al., "Flexible transport of 3-d video over networks", Proceedings of the IEEE, IEEE_New York, US, vol. 99, No. 4, Apr. 2011.
European Search Report—EP 12163635.1—dated Oct. 9, 2013.
European Office Action—EP 12163635.1—dated Oct. 15, 2015.
Response to EP OA—EP App 12163635.1—Filed Feb. 12, 2016.
European Summons to Oral Proceedings—EP App 12163635.1—Dated Mar. 16, 2017.
Jan. 31, 2018—Canadian Office Action—CA 2,772,509.
Anonymous, "Chapter 18: Configuring IGMP Snooping and Filtering" Apr. 20, 2007.
Jul. 3, 2018—European Office Action—EP12163635.1.
Minutes of Oral Proceedings—EP 1216365.1—Feb. 9, 2018.

* cited by examiner

DYNAMIC DISTRIBUTION OF CONTENT

CROSS-REFERENCE TO RELATED APPLICATIONS

This application is a continuation of U.S. patent application Ser. No. 16/438,833, filed Jun. 12, 2019, which is a continuation of U.S. patent application Ser. No. 15/208,113 (now U.S. Pat. No. 10,368,052), filed Jul. 12, 2016, which is a continuation of U.S. patent application Ser. No. 13/115,043 (now U.S. Pat. No. 9,420,259), filed May 24, 2011, each of which is hereby incorporated by reference herein in their entireties.

BACKGROUND

Three-dimensional (3D) display devices, such as television sets, are becoming increasingly popular, and so it is expected that demand for 3D multimedia content delivery by data distribution or access networks will steadily increase. At the same time, since 3D content typically may use more bandwidth than two-dimensional (2D) content, it is expected that the transmission of additional 3D content will present new challenges in balancing network bandwidth requirements with content quality.

Moreover, since the majority of consumer devices are not yet capable of consuming 3D content, and because the users of such devices demand high-quality 2D video, the networks find themselves needing to send both the 2D and 3D versions of the content to satisfy both types of devices. Thus, the addition of 3D content to an existing collection of 2D content typically may be expected to add significant bandwidth requirements to the network to serve a subset of consumer devices that are 3D-capable.

SUMMARY

Various aspects as described herein are directed to efficiently providing two-dimensional (2D) and three-dimensional (3D) versions of content (such as multimedia content) over a network to a plurality of client devices. This may be done by sending a first video component of the 3D content where only 2D client device viewing is desired, and where the first video component represents a 2D video image of multimedia content. Then, if a client device or user thereof desires to view the 3D version of the content, a second video component may also be sent. The 3D-enabled client device may combine the first and second video components, which may be used by the 3D-enabled client device to render and/or display the 3D content, and the 2D-enabled client devices may continue to consume only the first video component.

For example, some aspects are directed to methods, apparatuses, and software stored on non-transitory computer-readable media for sending data representing only one of a left or right component (left or right 2D video image) of multimedia content to a plurality of client devices; and sending, responsive to a request from one of the plurality of client devices, data representing both of the left and right components to the plurality of client devices.

Further aspects are directed to, for example, methods, apparatuses, and software stored on non-transitory computer-readable media for sending a first two-dimensional video component of three-dimensional multimedia content, and not a second two-dimensional video component of the three-dimensional multimedia content, to a plurality of client devices; and sending, responsive to a request from one of the plurality of client devices made while the first but not the second two-dimensional video component is being sent, the second two-dimensional video component to the plurality of client devices simultaneously with the first two-dimensional video component.

Still further aspects are directed to, for example, determining, responsive to a request from one of a plurality of client devices, whether to send only a first two-dimensional video component of three-dimensional multimedia content, or both the first two-dimensional video component and a second two-dimensional video component of the three-dimensional multimedia content, to a plurality of client devices; and causing, based on an outcome of the determining, either only the first two-dimensional video component, or both the first and second two-dimensional video components, to be sent to the plurality of client devices.

These and other aspects of the disclosure will be apparent upon consideration of the following detailed description.

BRIEF DESCRIPTION OF THE DRAWINGS

A more complete understanding of the present disclosure and the potential advantages of various aspects described herein may be acquired by referring to the following description in consideration of the accompanying drawings, in which like reference numbers indicate like features, and wherein.

DETAILED DESCRIPTION

Figure 1:
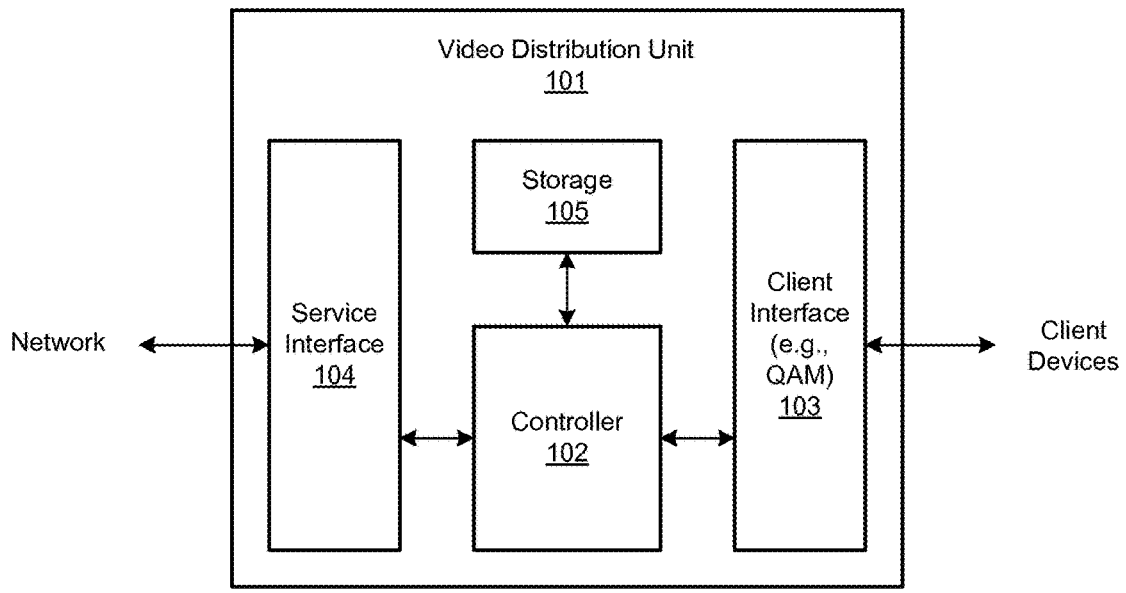
FIG. 1 is a block diagram of an example video distribution unit, in accordance with an embodiment of the present disclosure.

FIG. 1 is a functional block diagram of an example video distribution unit (VDU) 101 that may be used by a service or content provider, in or with a data distribution or access network, to provide content such as multimedia content. The content may be arranged as a plurality of data streams, to a plurality of client devices. In some embodiments, VDU 101 may be implemented as, or otherwise include, be associated with or be part of, a termination system (TS), such as a modem termination system (MTS). In some networks, such as hybrid fiber coaxial (HFC) networks, the TS may be a DOCSIS compliant cable modem termination system (CMTS) or a converged multi-service access platform (CMAP). In further embodiments, such as where the data distribution or access network includes other types of networks (e.g., a satellite network, fiber optic network, cellular telephone network, wireless network, etc.), VDU 101 may be implemented as, or otherwise include or be part of, a corresponding transmission facility or other desirable place in such a network. In some embodiments, such as where the network is an Internet Protocol (IP) based network, VDU 101 may be implemented as, or otherwise include or be part of, an IP-based video distribution system. Also, although FIG. 1 shows only a single VDU 101, the data distribution or access network may have or be coupled to a plurality of different VDUs, each serving a different plurality of client devices.

VDU 101 in this example includes a controller 102, a client interface 103, a service interface 104, and storage 105. While various functional blocks 102-105 are shown in FIG. 1, two or more of these functional blocks may or may not be physically combined together into a single physical unit. Moreover, one or more of these functional blocks may be sub-divided into multiple physical units. In other words, the functional block divisions as shown in FIG. 1 (and the other figures herein) may either correspond to or be independent of the physical implementation of the functional blocks. Each of blocks 102-105 will be discussed in turn below.

Controller 102 may be or otherwise include any one or more processors and/or other types of computers, and may be responsible for controlling the functionality of VDU 101. For example, any manipulation of data, decision-making functions, or any other functions attributed to VDU 101 may be performed and/or controlled by controller 102. In some embodiments, controller 102 may be or otherwise include the above-mentioned TS (e.g., MTS and/or CMTS).

A computer may be any electronic, electro-optical, and/or mechanical device, or system of multiple physically separate such devices, that is able to process and manipulate information, such as in the form of data. Non-limiting examples of a computer include one or more processors, personal computers (e.g., desktop or laptop), servers, smart phones, personal digital assistants (PDAs), televisions, television set top boxes, gateways, and/or a system of these in any combination or subcombination. In addition, a given computer may be physically located completely in one location or may be distributed amongst a plurality of locations (i.e., may implement distributive computing). A computer may be or include a general-purpose computer and/or a dedicated computer configured to perform only certain limited functions.

A computer may include hardware that may execute software to perform specific functions. The software, if any, may be stored on a tangible non-transient computer-readable medium (such as a hard drive and/or memory) in the form of computer-executable instructions. A computer may read those computer-executable instructions, and in response perform various steps as defined by those computer-executable instructions. Thus, any functions attributed to VDU 101 as described herein may be implemented, for example, by reading and executing such computer-executable instructions for performing the functions of those respective elements, and/or by any hardware subsystem from which the computer is composed. Additionally or alternatively, any of the above-mentioned functions may be implemented by the hardware of the computer, with or without the execution of software. For example, the computer may be or include an application-specific integrated circuit (ASIC), field-programmable gate array (FPGA), or other type of circuitry that is configured to perform some or all of the functions attributed to the computer.

A computer-readable medium may include not only a single non-transitory information storage medium or single type of such storage medium, but also a combination of one or more such storage media and/or types of such storage media. Examples of a computer-readable medium include, but are not limited to, one or more memories, hard drives, optical discs (such as CDs or DVDs), magnetic discs, and magnetic tape drives.

Such a computer-readable medium may store computer-executable instructions (e.g., software) and/or computer-readable data (i.e., information that may or may not be executable). Thus, referring to the example of FIG. 1, a computer-readable medium (such as memory and/or a hard drive) may be included in storage 105, and may store computer-executable instructions and/or data used by VDU 101. Alternatively or additionally, such a computer-readable medium storing the data and/or computer-executable instructions may be physically separate from, yet accessible by, VDU 101.

Service interface 104 may be or otherwise include hardware and/or software for communicating with the data distribution or access network. For example, any multimedia content to be passed on to the client devices may be received by one or more physical and/or logical ports of service interface 104. Also, any requests to or from VDU 101 to the data distribution or access network may be sent via service interface 104. Thus, service interface 104 may include bi-directional communication capability with the data distribution or access network. The service interface 104 may be, for example, a modem (e.g., coaxial cable modem, fiber optic modem), cellular or other wired or wireless transceiver, etc.

Client interface 103 may be or otherwise include hardware and/or software for communicating with the client devices. For example, any multimedia (e.g., audio and/or video) content to be streamed or otherwise transmitted to the client devices may be sent via one or more physical and/or logical ports of client interface 103. Also, any requests from the clients to VDU 101 may be received via client interface 103. Thus, client interface 103 may also include bi-directional communication capability with the client devices. Client interface 103 may output the multimedia content as data, which may or may not be modulated into one or more frequency bands or other types of channels. For example, where the data is modulated, client interface 103 may include a modem for performing the modulation. Additionally or alternatively, client interface 103 may include or be coupled to one or more quadrature amplitude modulators (QAMs) where the video is desired to be sent to the client devices as QAM modulated streams. The client interface 103 may be, for example, a Multimedia Over Coax Alliance (MoCA) interface circuit, an Ethernet router, an IEEE 802.11 wireless access point, BLUETOOTH transceiver, or any other desired interface for communications with the client devices. In further aspects, client interface 103 may communicate with the client devices using, e.g., Internet Protocol over a packet-switched network.

Thus, VDU 101 may receive multimedia content from the data distribution or access network, and may distribute that multimedia content to the client devices as one or more data streams. VDU 101 may also perform other functions, such as but not limited to determining which multimedia content will be streamed, compression (including re-compression) of multimedia content, handshaking and registration with the client devices, and responding to requests from client devices. In some embodiments, especially where the data distribution or access network is or includes a cable or HFC network, communications and video streaming with the client devices may be in accordance with Data Over Cable Service Interface Specification (DOCSIS). However, other standards and protocols may additionally or alternatively be used.

Multimedia content may include video content, audio content, and/or any other data along with the video. For example, multimedia content may be limited to only video, or may include both audio and video, or may include video, audio, and data (e.g., closed-captioning data, interactive applications, timing information, etc.). The data streams may be encoded in any desired manner, and may or may not be encrypted and/or compressed as desired. For example, the data streams may be MPEG streams encoded in, e.g., MPEG-2 format or MPEG-4 format.

Figure 2:
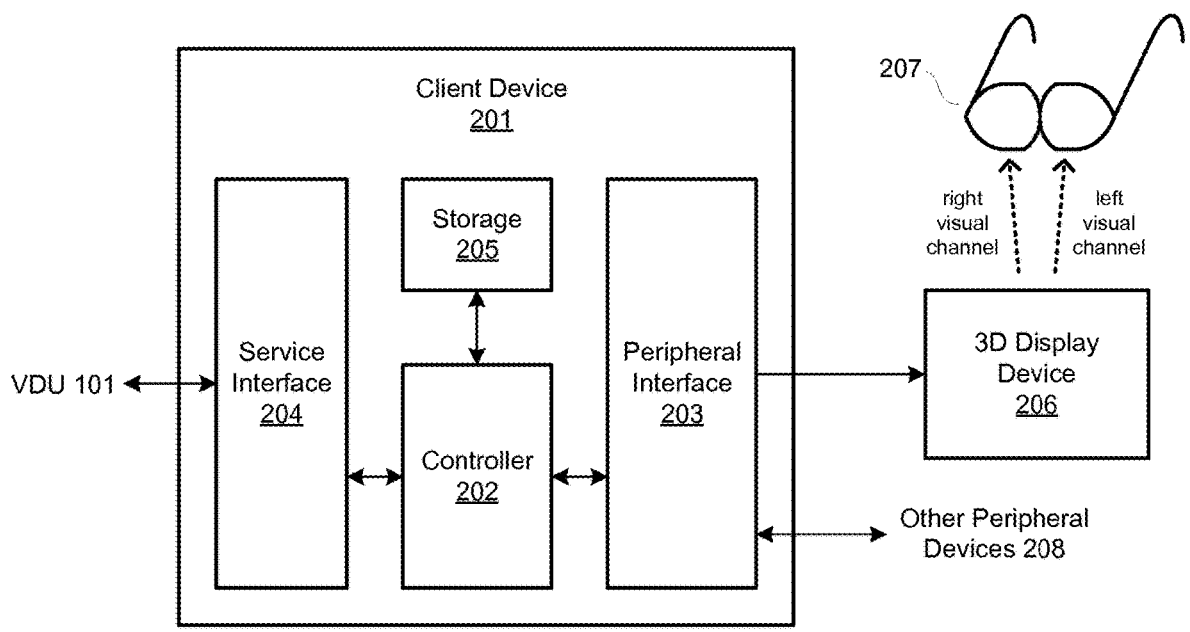
FIG. 2 is a block diagram of an example client device, in accordance with an embodiment of the present disclosure.

The client devices may each be embodied as shown, for example, in the functional block diagram of FIG. 2. Each of the client devices may be configured to receive and tune to one or more of the streams received from video distribution unit 101, and to send information to VDU 101.

Each client device 201 in this example includes a controller 202, a peripheral interface 203, a service interface 204, and storage 205. While various functional blocks 202-205 are shown in FIG. 2, two or more of these functional blocks may or may not be physically combined together into a single physical unit. Moreover, one or more of these functional blocks may be sub-divided into multiple physical units. In other words, the functional block division as shown in FIG. 2 may either correspond to or be independent of the physical implementation of the functional blocks. Each of blocks 202-205 will be discussed in turn.

Like controller 102 discussed previously, controller 202 may be or otherwise include any one or more processors and/or other types of computers, except in this case controller 202 may be responsible for controlling the functionality of client device 201. For example, any manipulation of data, decision-making functions, tuning functions, and any other functions attributed to client device 201 may be performed and/or controlled by controller 202.

Client device 201 may be any type of device capable of receiving and consuming the streams provided by VDU 101, such as by recording the streams to a computer-readable medium (e.g., hard drive and/or FLASH memory) and/or causing the streams to be rendered and presented as video and/or audio (e.g., via a video display and speakers). Non-limiting examples of client devices include display devices, personal computers, portable computers such as smart phones, laptop computers, and tablet computers, two-dimensional televisions, three-dimensional televisions, mobile/portable television devices, gateways, set top boxes, digital video recorders, and home media servers.

Each client device 201 may be or include a computer. Thus, any functions attributed to client device 201 as described herein may be implemented, for example, by reading and executing computer-executable instructions for performing those functions, and/or by any hardware subsystem from which the computer is composed. Additionally or alternatively, any of the functions of client device 201 may be implemented by the hardware of the computer, with or without the execution of software.

The computer-executable instructions and/or data used by each client device 201 may be stored in respective storage 205. Storage 205 may or include be any type of computer-readable medium.

Service interface 204 may be or otherwise include hardware and/or software for communicating with VDU 101. For example, any multimedia content streamed to client device 201 may be received by one or more physical and/or logical ports of service interface 204. Accordingly, client interface 103 of VDU 101 and service interface 204 of client device 201 may be directly or indirectly coupled together. Also, any requests from client device 201 to VDU 101 may be sent via service interface 204. Thus, service interface 204 may include bi-directional communication capability with VDU 101.

Service interface 204 and/or controller 202 may also implement or otherwise include a tuner for selectively tuning to one or more (e.g., a subset) of a larger plurality of streams provided (e.g., streamed) by VDU 101. The particular streams to which client device 201 is tuned to may depend upon user commands (via peripheral interface 203) and/or other data provided by VDU 101 (via service interface 204). Where the streams are sent as streams of data packets, tuning as referred to herein may include known techniques such as selectively choosing certain ones of the received data packets based on identifiers in those packets (such as program identifiers or IP addresses) and/or tuning into a selected portion of total available frequency bandwidth over which the data packets may be modulated.

Peripheral interface 203 may be or otherwise include hardware and/or software for communicating with one or more three-dimensional (3D) display devices (such as 3D display device 206) and/or one or more other peripheral devices 206, such as two-dimensional display devices (e.g., 2D television sets or video monitors), other types of video displays, remote controls, and keyboards. For example, multimedia content and data (e.g., electronic program data) tuned to and received via data streams may be presented for display on a television set or other video display via a video port of peripheral interface 203. As another example, user selections of data streams and/or of various options may be made via a remote control, and indications of these user selections may be communicated to client device 201 via an infrared or radio frequency remote control port of, for example, peripheral interface 203.

Where client device 201 is 3D-enabled, 3D multimedia content may be received from VDU 101 into service interface 204, processed by service interface 204, controller 202, and/or peripheral interface 203, and provided by peripheral interface 203 to 3D display device 206. 3D display device may then display left and right components (left and right video images) to the user, who may be able to view the displayed left and right components using 3D glasses 207 or by other means. In some embodiments, 3D display device 206 may be physically separate from client device 201, and in other embodiments, 3D display device 206 may be physically integrated with client device 201. An example of a 3D display device 206 is a 3D television.

Figure 3:
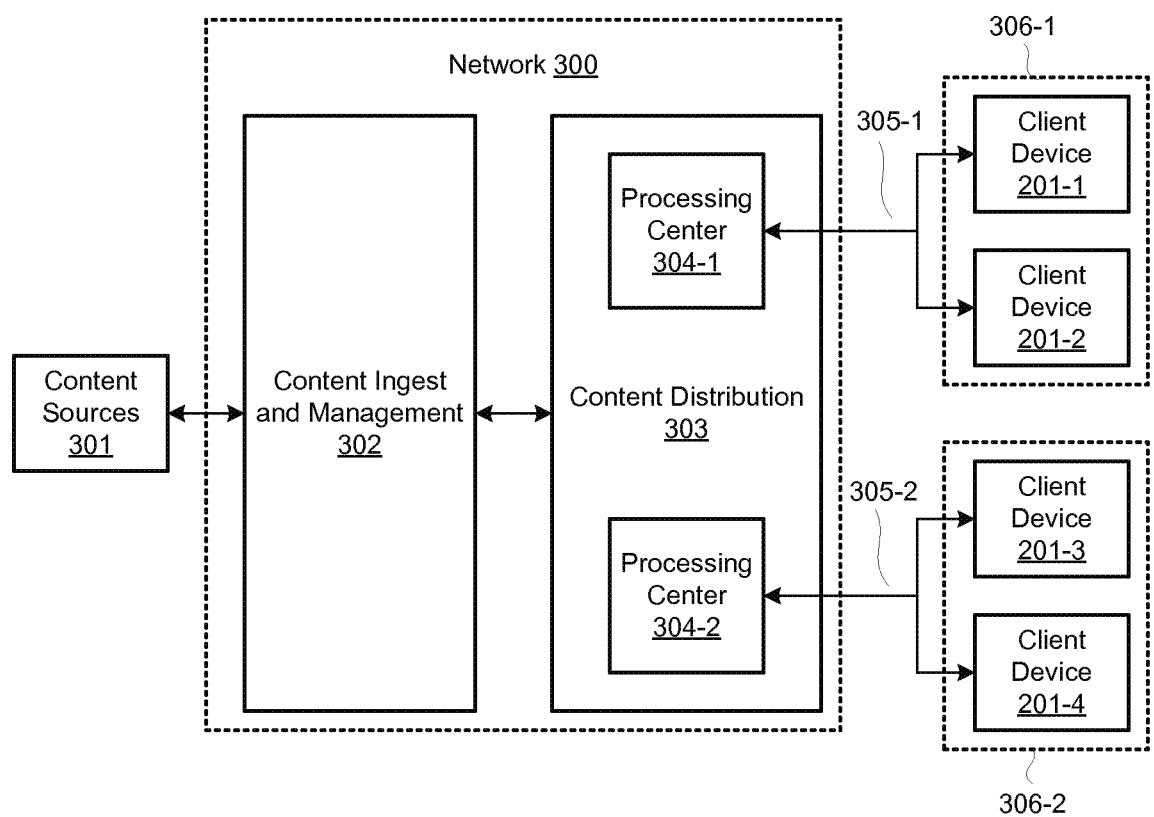
FIG. 3 is a block diagram of an example system including a data distribution or access network, in accordance with an embodiment of the present disclosure.

FIG. 3 illustrates an example data distribution or access network 300 on which many of the various features described herein may be implemented. Network 300 may be any type of data distribution or access network, such as satellite, telephone, cellular, wireless, etc. One example may be an optical fiber network, a wireless network, a coaxial cable network, an HFC distribution network, a PON network, or a combination of various types of networks. Such networks 300 use a series of interconnected communication lines or links 305 (e.g., coaxial cables, optical fibers, wireless, etc.) to connect multiple users having client devices 201 to a processing center (e.g., headend, central location, etc.) 304. In this example, network 300 has two processing centers 304-1 and 304-2, each of which may serve a different subset, or client device group, of the client devices 201. Each processing center may serve, for example, client devices of a client device group located within a particular geographical region. It may be expected that, where network 300 serves a large number of users (e.g., customers or subscribers) spread over a large geographical area, network 300 may have many more than two processing centers. Two example client device groups are shown in FIG. 3—client device group 306-1, which includes client devices 201-1 and 201-2 and which is coupled to processing center 304-1 via link 305-1, and client device group 306-2, which includes client devices 201-3 and 201-4 and which is coupled to processing center 304-2 via link 305-2. While two client device groups each including two client devices is shown, this is merely an example; the system may include many more client device groups each with many more client devices, and many more processing centers to serve those client device groups.

Network 300 in this example may include a content ingest and management portion 302, which may receive content (e.g., multimedia content, which may include metadata) from one or more content sources 301, and may further transform (e.g., transcode) and/or store the content for eventual distribution by a content distribution portion 303, which may include the one or more processing centers 304.

The processing centers 304 may each transmit downstream data signals onto the lines 305 (which may be any type of wired and/or wireless communication link), and as discussed previously, each client device 201 may have one or more tuners used to selectively receive and/or selectively process those signals. There may be, for example, one line 305 originating from each processing center 304, and it may be split a number of times to distribute the signal to various homes containing or otherwise associated with the client devices 201 that are in the vicinity (which may be many miles) of the processing center 304. The lines 305 may include components not illustrated, such as splitters, filters, amplifiers, etc. to help convey the signal clearly, but in general each split introduces a bit of signal degradation. In some embodiments, portions of the lines 305 may also be implemented with fiber-optic cable, while other portions may be implemented with coaxial cable, other lines, or wireless communication paths. By running fiber optic cable along some portions, for example, signal degradation in those portions may be significantly minimized, allowing a single processing center 304 to reach even farther with its network of lines 305 than before.

Each processing center 304 may include one or more of the VDUs 101. As discussed previously, each VDU 101 may include or be supplemented with a termination system (TS), such as a cable modem termination system (CMTS), which may be a computing device configured to manage communications between devices on the network of lines 305 and backend devices such as content sources (e.g., video on demand servers, television program sources, etc.), headend computers and other networks. The TS may be as specified in a standard, such as the DOCSIS standard, or it may be a similar or modified device instead. The TS may be configured to place data (such as multimedia streams) on one or more downstream frequency bands (sometimes referred to as channels) to be received by client devices 201, and to receive upstream communications from those client devices 201 on one or more upstream frequency bands, as well as to serve as an interface to devices and networks that are further upstream, such as other Internet Protocol-compliant devices. Each downstream frequency band may be 6 MHz in width, for example, and have a different center frequency. However, the frequency bands may be arranged in the frequency spectrum in any manner desired and have any width desired.

As will be described by way of example, below, a method may be performed to deliver two-dimensional ("2D") and/or three-dimensional ("3D") multimedia content to one or more groups of client devices. In particular, certain video components of an item of 3D multimedia content may be delivered to a client device group depending upon whether those video components are expected to be consumed by at least one client device in that group. For instance, where only 2D-capable client devices in the group are viewing a particular item of 3D multimedia content, then only a first of two video components of the item may be delivered. The first of the two video components may represent a 2D video picture of the item of content, such as either the left components or the right component, and may also include audio tracks and/or closed-captioning data for that 2D item of content. If, however, one or more client devices in the group request to consume the 3D version of the item, then both of the video components may be delivered to the group, including any audio tracks and/or closed-captioning data for the 3D version. The second video component (and associated audio component and/or closed-captioning data) may be added on demand using, e.g., known switched digital video (SDV) techniques. Those client devices that are not 3D-capable may simply ignore the added video component including any audio tracks and/or closed-captioning data for the added video component. Since the first and second video components together define the 3D video content, those client devices that are 3D-capable may combine the first and second video components to record, display, or otherwise consume the 3D content. In other words, rather than separately sending both the 2D and 3D versions of the content at the same time, which would utilize a relatively large amount of bandwidth, one or both video components may be selectively and dynamically sent on an as-needed (e.g., on-demand) basis. This may satisfy both the 2D-enabled and 3D-enabled client devices while potentially utilizing less average and/or peak bandwidth. This may be useful because communication line 305 to each client device group typically has a limited bandwidth capacity.

Figure 4:
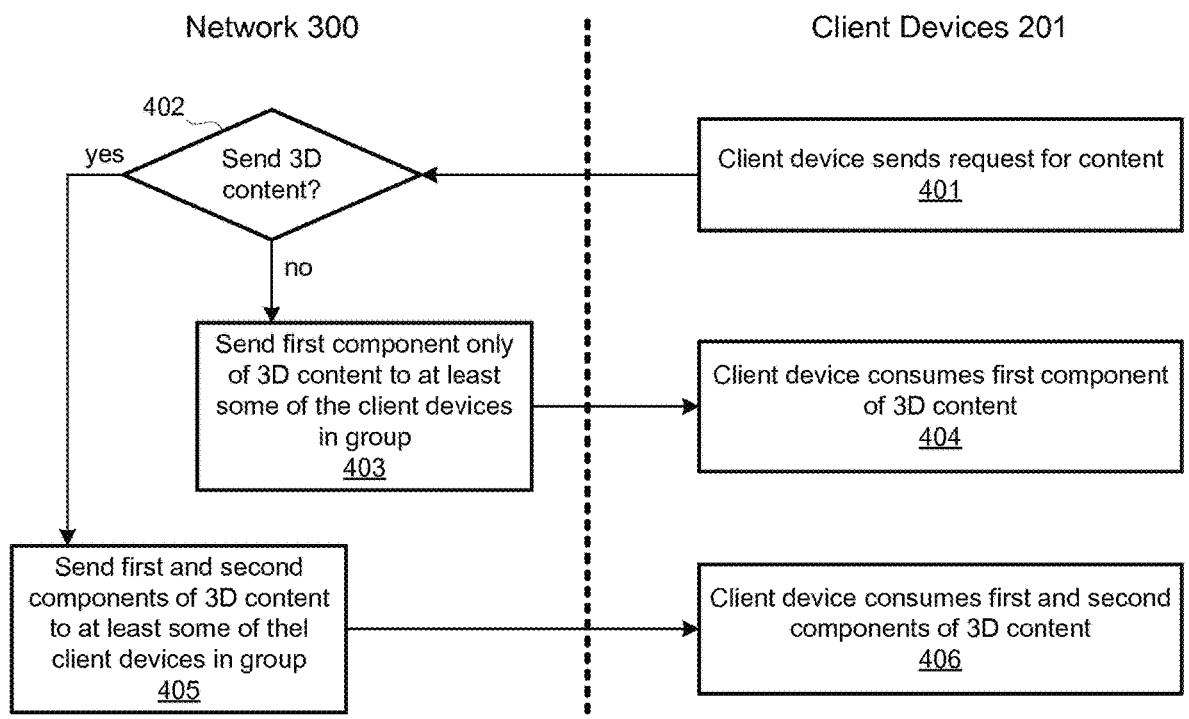
FIG. 4 is a flow chart of an example method that may be performed, in accordance with at least one embodiment of the present disclosure.

FIG. 4 is a flowchart showing an example of such a method. The left side of the flowchart indicates examples of what may be performed by data distribution or access network 300, and the right side of the flowchart indicates examples of what may be performed by one or more of client devices 201. While the various steps of the process of FIG. 4 are shown in a particular order and are divided in a particular manner, it is to be understood that such ordering and divisions are merely illustrative. Any of the steps may be re-ordered as appropriate and desired, performed simultaneously, and/or merged into fewer steps and/or further subdivided into additional steps.

At step 401, if a particular item of content (or version thereof, such as a high-definition version of a particular movie) desired to be consumed by a client device 201 and/or its end user is not currently being streamed to client device 201, then client device 201 sends a request upstream to data distribution or access network 300, indicating the desired item of content. The request may be sent to, e.g., one of the processing centers 304 associated with the client group that includes the client device making the request. For instance, if the requesting client device is client device 201-1, then the request may be sent to processing center 304-1. If the content (or version thereof) is already being streamed to client device 201, then the request may not be sent and instead client device 201 may simply tune to the appropriate stream(s) to obtain the desired content.

Figure 5:
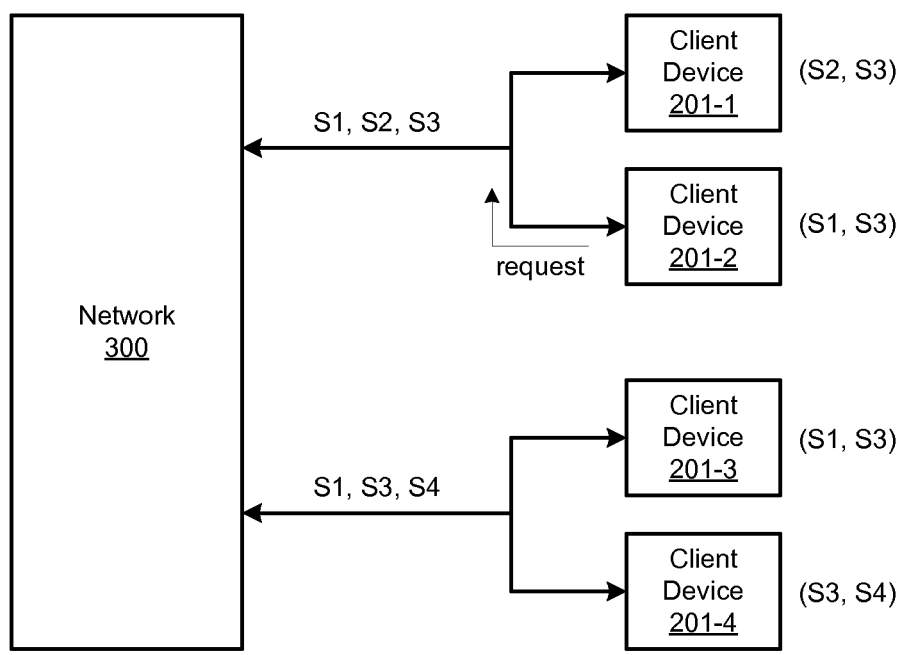
FIG. 5 is a block diagram of an example interaction between a data distribution or access network and client devices, in accordance with at least one embodiment of the present disclosure.

For purposes of explanation, it will be assumed by way of example that the configuration of the client devices and the data streams being sent to those client devices are as shown in FIG. 5 at the time that the step 401 request is made. As shown in the example of FIG. 5, client devices 201-1 and 201-2 are part of a first client device group, and client devices 201-3 and 201-4 are part of a second client device group. Each client device group may be served by a different processing center 304 (such as shown in FIG. 2). At the time that the request at step 401 is made, data distribution or access network 300 is currently streaming streams S1, S2, S3, and S4 as shown in FIG. 5. The streams in parenthesis to the right of each client device 201 in FIGS. 5-7 indicate the particular streams currently being consumed by those devices. For instance, in FIG. 5, even though streams S1, S2, and S3 are all being provided to client device 201-1 (i.e., client device client device 201-1 is being exposed to streams S1, S2, and S3), client device 201-1 is currently consuming (e.g., tuning to) only streams S2 and S3. The unconsumed stream(s) may be discarded or otherwise ignored. As is well known, each client device 201 may have one or more separate physical and/or logical tuners that may allow each client device 201 to consume one or more streams simultaneously.

Referring again to FIG. 4, in response to the step 401 request, data distribution or access network 300 (e.g., processing center 304-1 and/or VDU 101) may determine, at step 402, whether a 3D version of the content or a 2D version of the content should be delivered to the group that includes the requesting client device 201-1.

Figure 6:
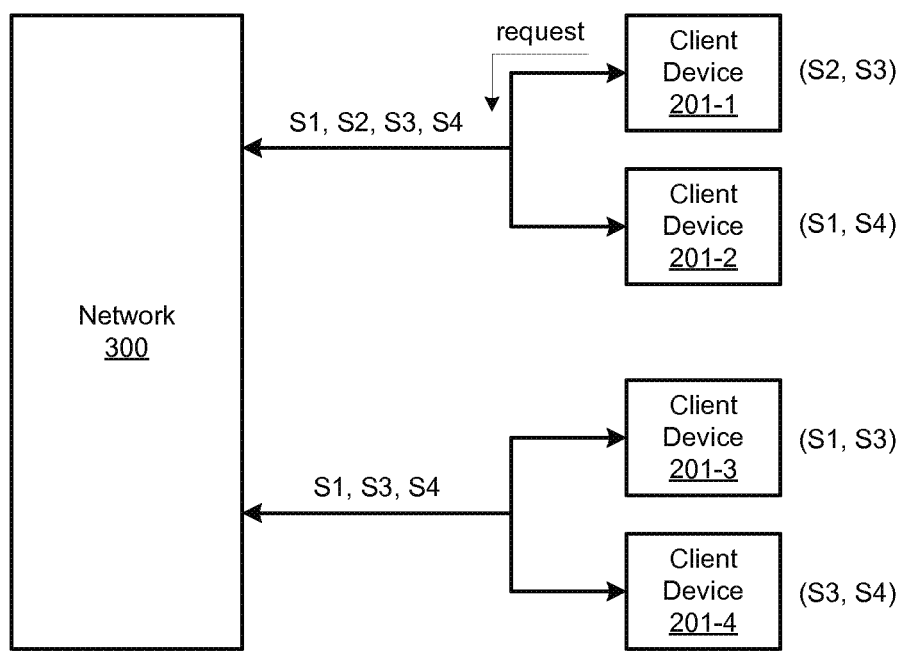
FIG. 6 is a block diagram of another example interaction between a data distribution or access network and client devices, in accordance with at least one embodiment of the present disclosure.

In some embodiments, sending the 2D version involves sending only a portion of the 3D version of the content, such as a first video component (e.g., the left or right component) of two video components of the 3D version. Likewise, sending the 3D version may involve sending both of the first and second video components. Thus, if at step 402 it is determined that only the 2D version of the content is needed, then the process may move to step 403, in which data distribution or access network 300 (e.g., VDU 101) sends the first video component (but not the second video component) to some or all of the client device group. In that case, at step 404 the requesting client device 201-1 (but not necessarily the other client devices in that client group) would consume the received first video component, such as by recording and/or displaying the 2D content as represented by the first video component. For example, assume that the step 401 request is made during the above-discussed configuration of FIG. 5, and that the request is determined to be for a 2D version of content not yet being streamed to that client group. Thus, at step 403, and as shown in FIG. 6, the first video component of that content may be streamed as stream S4 to the client group. In this case, perhaps only the requesting client device in that client group would consume stream S4, even though others, or even all, of the client devices in that client group are also exposed to stream S4.

Figure 7:
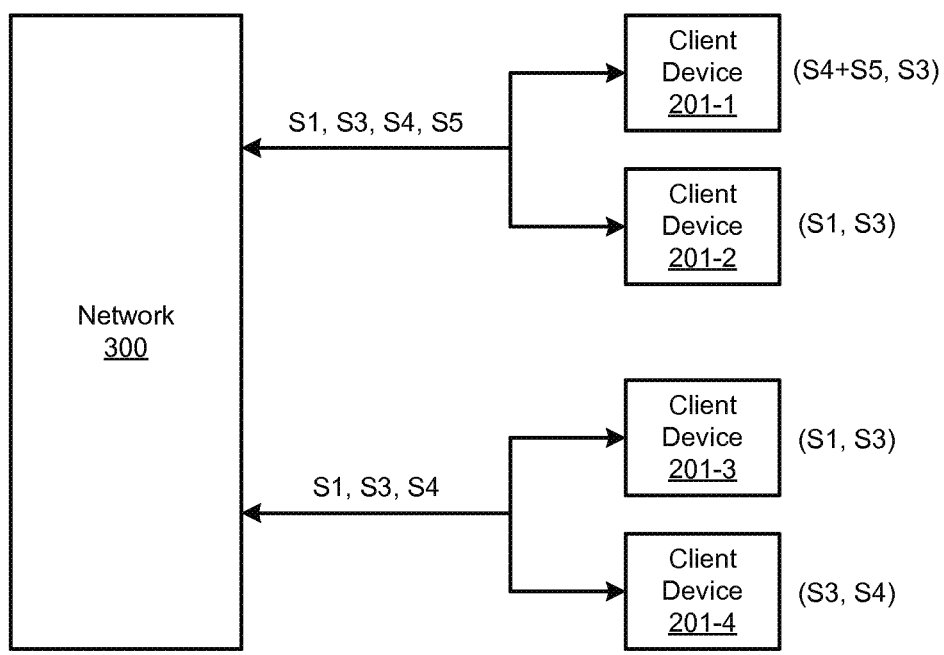
FIG. 7 is a block diagram of an example interaction between a data distribution or access network and client devices, in accordance with at least one embodiment of the present disclosure.

Alternatively, if it is determined at step 402 that the 3D version of the content is needed, then the process may move to step 405, in which data distribution or access network 300 (e.g., VDU 101) begins sending both the first and second video components simultaneously to some or all of the client device group. In that case, at step 406 the requesting client device 201-1 (but not necessarily the other client devices in that client group) would consume the received first and, as desired, the second video component. Such consumption may include, for instance, recording and/or displaying the 3D content as represented by the first video component. For example, assume that the step 401 request is made during the configuration of FIG. 6, and that the request is determined to be for a 3D version of content in which only the first video component is being streamed (in this case, as stream S4) to the client group. Thus, at step 405, and as shown in FIG. 7, the first and second video components of that content may both be streamed (such as in streams S4 and S5) to the client group. In other words, while the first video component is being streamed in stream S4, the second video component may begin to also be streamed in stream S5. In this case, perhaps only the requesting client device in that client group would consume streams S4 and S5 together, even though all of the client devices in that client group are exposed to streams S4 and S5. In fact, in the example shown in FIG. 6, client device 201-1 is consuming streams S3 and S4 (which when combined provide the requested 3D content), as well as stream S5, and client device 201-2 is consuming streams S1 and S3. Whether or not certain video components are sent to a particular client device group may have no bearing on whether those video components are also sent to another client device group; each client device group may independently follow the process of FIG. 4 without regard to what video components are being sent to other client device groups.

There are various ways to determine, at step 402, whether 2D or 3D content should be sent in response to a request. For example, the request itself may identify whether the 2D or 3D version is requested. In this case, the request may include an identification of the content (e.g., a content ID that is a numeric or alphanumeric identifier associated with a particular version of a movie or other content) and an identification of the format (e.g., 2D or 3D; high definition or standard definition; screen size; resolution; frame rate, etc.). Or, the request may include a content ID that itself is unique for every item of content and/or each of multiple versions or video components thereof. For instance, the same item of content may have a first content ID for the 2D version and a second content ID for the 3D version. Another way to determine whether 2D or 3D content should be sent is for data distribution or access network 300 to maintain or otherwise have access to a database storing properties about each of the client devices. This information may be part of, for instance, a subscriber account database, and may indicate, for each client device, whether that client device is a 2D-enabled device or a 3D-enabled device. If the request includes an identification of the client device (e.g., by MAC address, serial number, or IP address), then data distribution or access network 300 (such as any computer part of network 300) may look up the 2D versus 3D enabled configuration of the requesting client device and make a decision accordingly at step 402 as to whether to send 2D or 3D content in response to the request.

The 2D versus 3D enabled configuration of a particular requesting client device may be permanently tied to the requesting client device (e.g., the requesting client device may always be a 2D client device), or the configuration may depend upon a current state or mode of the requesting client device (e.g., the requesting client device may sometimes be considered a 2D configured client device and at other times considered a 3D configured client device, at the option of the client device and/or the user). In some embodiments, the client device may store, such as in a lookup table, a 2D versus 3D setting for each channel and/or program. The associated setting for a given channel or program may depend, for instance, on whether the user has previously requested to watch 3D content on that channel and/or for that program. For example, if the user requests to watch a particular program in 3D, then the client device may associate that program with a 3D configuration, and so the next time the user views that program (or a related program), then the client device may automatically request the 3D version of that program from the network. In further embodiments, where the client device is coupled to a separate television or other display device, then the client device may poll the display device (e.g., via HDMI or Ethernet) to determine whether the display device is a 2D capable display device or a 3D capable display device. In such embodiments, the client device may also automatically verify whether the display device is connected properly to the client device. This may help avoid a situation such as where the display device that is a 3D capable is connected to the client device by both HDMI and s-video, but the user has incorrectly selected the s-video input to view a high-definition 3D item of content, even though s-video currently does not support high-definition video.

At steps 403 and 405, in addition to sending the first and/or second video components, data distribution or access network 300 may also send first and/or second audio tracks, and/or first and/or second subtitle data. It may be desirable to selectively send first and/or second audio tracks and first and/or second subtitle data depending upon whether one or both of the first and second video components are sent. This may be done to effectively provide a "2D" associated audio track for 2D-enabled client devices and a "3D" associated audio track for 3D-enabled client devices. This may be useful where, for instance, the 2D and 3D versions of the multimedia content may be desired to be associated with different audio tracks and/or subtitles. For example, if there were only one audio track for both the 2D and 3D versions, and the audio track included a discussion of a 3D feature that is not viewable by 2D-enabled client devices, then the users of those 2D-enabled client devices might be confused by the discussion. Thus, at step 406, where both the first and second audio tracks and the first and second subtitle data are sent, those client devices tuned to only the 2D version (i.e., only the first video component) of the multimedia content may consume only the first audio track and/or the first subtitle data, and ignore the second audio track and/or the second subtitle data.

To accomplish this, at step 403, data distribution or access network 300 may send the first video component, the first audio track, and the first subtitle data to the plurality of client devices. At step 405, data distribution or access network 300 may send both the first and second video components, both the first and second audio tracks, and both the first and second subtitle data to the plurality of client devices.

Figure 8:
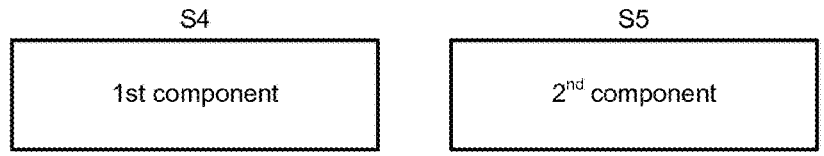
FIG. 8 is a block diagram of an example relationship between streams and 3D content video components, in accordance with at least one embodiment of the present disclosure.
Figure 9:
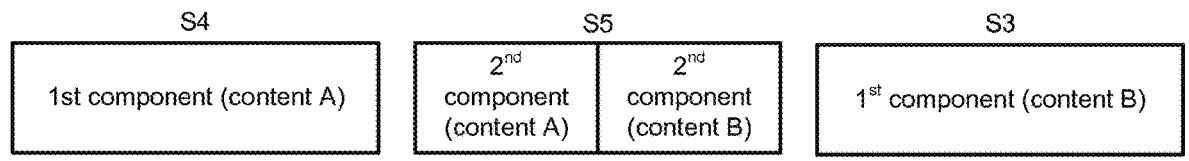
FIG. 9 is a block diagram of another example relationship between streams and 3D content video components, in accordance with at least one embodiment of the present disclosure.

In several examples discussed previously, the first and second video components are sent in separate data streams. However, the video components may be sent in any manner desired, such as part of the same stream or even in a non-stream format. Where the first and second video components are sent as streams, they may be divided amongst various streams in a variety of ways. For instance, the first and second video components of an item of 3D content may each be sent in their own separate stream. FIG. 8 shows an example in which the first video component is sent in stream S4 and the second video component is sent in stream S5. In this example, each of the first and second video components may have equal (e.g., 720p, 1080i, or 1080p high-definition; or 480i or 480p standard or enhanced definition) bandwidth. In another example, one or more of the video components of a first item of 3D content may share a stream with one or more video components of a second item of 3D content. FIG. 9 shows an example in which the first video component (e.g., one of the left or right components) of content A is sent in stream S4 and the second video component (e.g., the other of the left or right components) of content A is sent in stream S5. In addition, the first video component (e.g., one of the left or right components) of content B is sent in stream S3 and the second video component (e.g., the other of the left or right components) of content B shares the same stream S5 as the second video component of content A. Due to the sharing of streams, and depending upon the bandwidth of each stream, the first and second video components of a given item of content may or may not be assigned equal bandwidth. In the example of FIG. 9, assuming that each stream S3, S4, S5 is of equal bandwidth, the second video components of each of content A and B may be approximately half the bandwidth of the respective first video components. For instance, if the first video components of contents A and B each represent 1080p high-definition video, the second video components of contents A and B may each represent lower resolution video, such as standard-definition 480i or enhanced definition 480p video.

When a client device 201 desires to consume 3D content made up of multiple video components, the video components may be combined by the client device 201 in a manner that may depend upon what the video components represent. Such combining may be performed by, e.g., controller 202, peripheral interface 203 and/or by 3D display device 206. For example, if the first video component is data representing the left 2D component and the second video component is data representing the right 2D component, then client device 201 may interpret these video components as such and display them in a combined manner as 3D content. For example, the left and right 2D components may be interleaved in time and synchronized with electronically-controlled goggles worn by a human viewer. Or, the left and right channels may be sent to different display elements of client device 201. In such embodiments, the second video component may be of a lower resolution than the first video component. For example, where the first video component represents a left 2D component at a first resolution, the second video component may represent the right 2D component at a second resolution that is half the first resolution. In other examples, the first video component may represent a 2D video image (e.g., either the left or right component), and the second video component may represent depth data or delta data associated with the 2D video image. Depth data, which is currently known in some 3D rendering systems, may itself be a 2D image representing the three-dimensional depth of each pixel or other unit of the original 2D video image. Delta data, which is also currently known in some 3D rendering systems, may itself be a 2D image representing the difference between the 2D video image and another 2D video image. For example, if the first video component represents the left component or the right component, then the delta data may represent the difference between the represented left and right components. Thus, when one of the left or right components and the delta data are both provided, the other of the left or right components may be calculated from this information. In further embodiments, the second video component may be, for example, a Multiview Video Coding (MVC) layer or a Scalable Video Coding (SVC) enhancement layer (which both may conform to the H.264/MPEG-4 Advanced Video Coding standard). In at least some of these embodiments, the second video component may be expected to require less bandwidth than would a complete video image (e.g., a full resolution left or right component).

Using an SVC enhancement layer as the second video component could be useful even to a 2D-enabled client. For example, if the only version of a particular item of content is a 3D frame-compatible version (e.g., where the left and right components are squeezed into a standard 2D high resolution video frame), when a 2D-enabled client device might simply ignore one of the left or right components and stretch the other of the left or right components into a full frame, this would result in a half-resolution 2D video frame. On the other hand, if the 2D-enabled client device were to request an SVC enhancement layer (which would require only incrementally more bandwidth than already used for the 3D content), then the 2D-enabled client device could use the SVC enhancement layer to generate a higher resolution 2D video frame for consumption.

Notwithstanding the above-discussed SVC enhancement utilized by a 2D-enabled client device, where a client device is not capable of or otherwise configured to render a 3D video picture from the first and second video components, then that client device may simply ignore the second video component even if it is provided. In any of these and other embodiments, the requesting client device may include, in the request at step 401, and indication of the type of second video component (e.g., full or half resolution right 2D component, or depth data, etc.).

Figure 10:
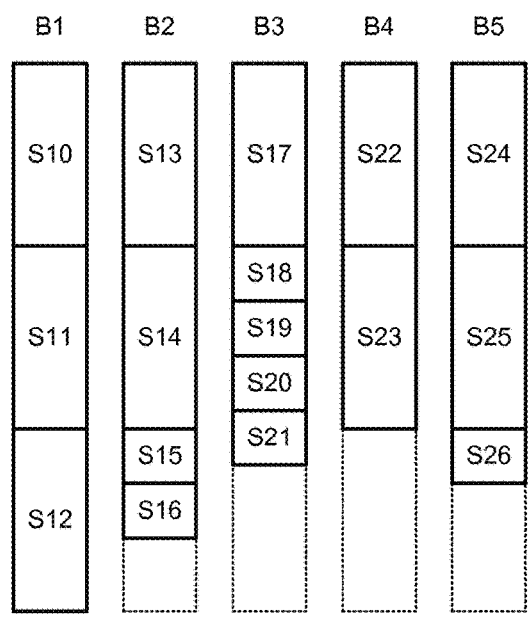
FIG. 10 is a block diagram of an example configuration of streams within a plurality of frequency bands, in accordance with at least one embodiment of the present disclosure.

As discussed above, in some embodiments, the various streams provided by data distribution or access network 300 to client device 102 may be modulated into various frequency bands. An example of this is depicted by the step diagram of FIG. 10, which shows five frequency bands B1, B2, B3, B4, B5 and seventeen streams S10-S26. Thus, for instance, it can be seen in this example that streams S10, S11, and S12 are all transmitted in frequency band B1, and streams S13, S14, S15, and S16 are all transmitted in frequency band B2. The vertical length of each frequency band and each stream indicates the amount of bandwidth reserved for that frequency band and stream. For example, it can be seen that stream S14 utilizes a larger amount of bandwidth than stream S18. This may be because, for instance, stream S14 may provide a higher-quality video picture such as a high-definition picture, whereas stream S15 may provide a lower-quality video picture such as a standard-definition picture.

As also discussed above, each client device 102 may have one or more tuners (e.g., radio frequency tuners, digital decoders, decryption software, and/or other desired components used to receive selected content data). Each tuner may be capable of selecting, for example, one frequency band (e.g., QAM channel) at a time. Thus, where one of the client devices 102 has two tuners, then client device 102 may be able to tune to two frequency bands simultaneously. When a client device 102 is tuned to a particular frequency band, it is able to receive any of the data streams within that frequency band. For example, if a client device 102 is tuned to frequency bands B2 and B4, then that client device 102 can receive any of the streams in those frequency bands, i.e., any of streams S13, S14, S15, S16, S22, and S23.

In those embodiments where different streams may be transmitted over different frequency bands, it may be desirable to transmit the two streams containing the first and second video components of the same 3D content together in the same frequency band whenever possible and/or practical. By doing so, this may reduce the number of frequency bands that a client device will need to tune to in order to receive 3D content. Since each client device may be capable of tuning to a predetermined maximum number of simultaneous frequency bands, this may help to conserve client device resources. For example, if a client device can tune to only two frequency bands simultaneously, and if the two video components of a particular item of 3D content are in streams S10 and S13, then in the example of FIG. 10 this 3D content item would utilize all of the frequency tuning resources of that client device (by simultaneously tuning to frequency bands B1 and B2). But, if instead the two video components of the 3D content item were provided in streams S10 and S11, for example, then that client device would only need to tune to frequency band B1, thus leaving free the other frequency tuning resource to tune to another stream in another frequency band. As another example, referring to the configuration of FIG. 7, it may be preferable to transmit streams S4 and S5 together in the same frequency band if there is sufficient bandwidth to do so. It is of course recognized that there may be other factors that dictate in which frequency bands various streams are transmitted, and so the two video component streams do not necessarily need to be transmitted in the same frequency band.

Figure 11:
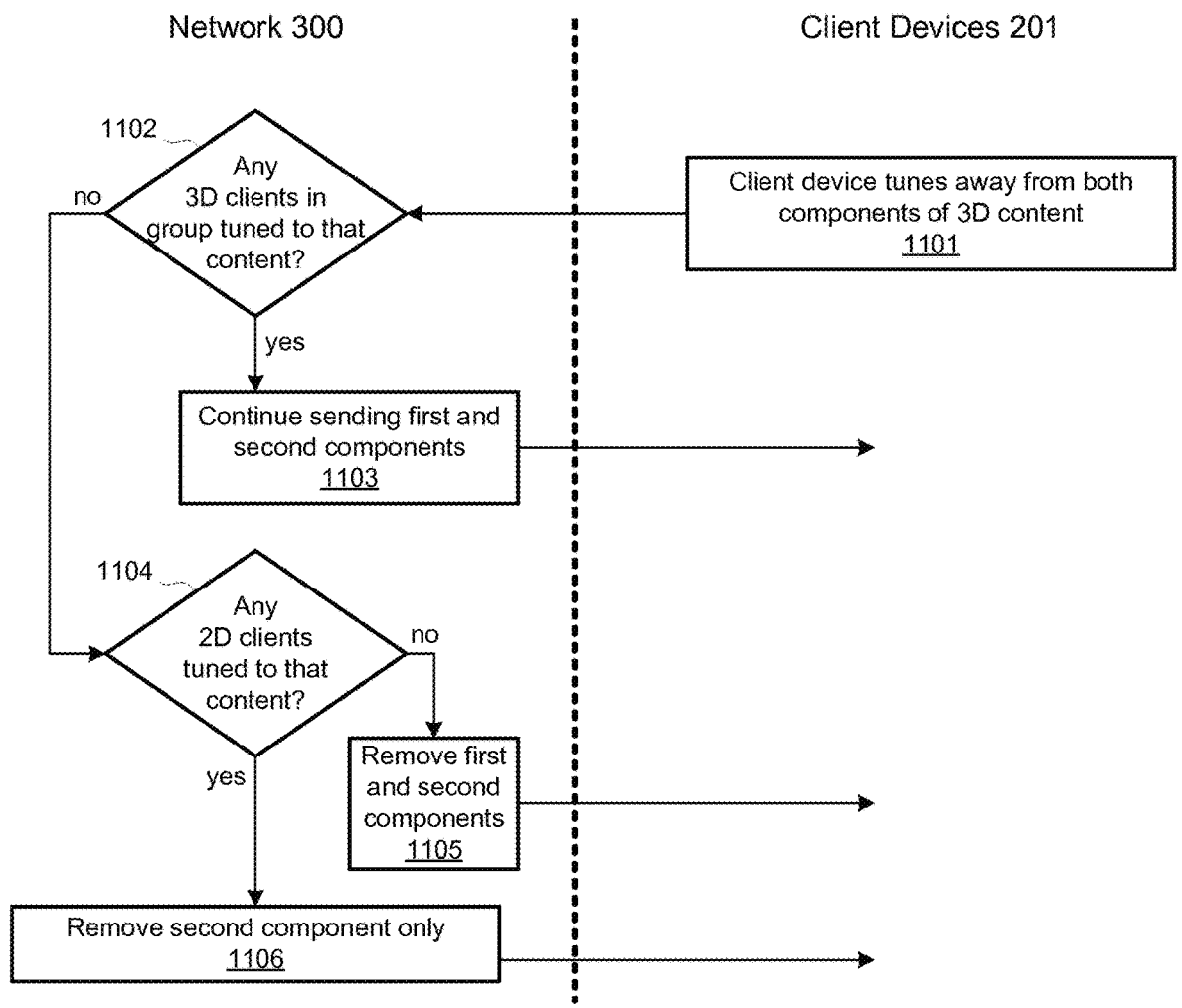
FIG. 11 is a flow chart of another example method that may be performed, in accordance with at least one embodiment of the present disclosure.

FIG. 11 is a flow chart showing a process that may be performed in response to a client device that has been consuming a 3D content item tuning away from (or otherwise no longer consuming) that 3D content item (step 1101). While the various steps of the process of FIG. 11 are shown in a particular order and are divided in a particular manner, it is to be understood that such ordering and divisions are merely illustrative. Any of the steps may be re-ordered as appropriate and desired, performed simultaneously, and/or merged into fewer steps and/or further subdivided into additional steps. In some embodiments, it may be determined that the client device is no longer consuming 3D content where the client device is in a 2D consumption mode (e.g., consuming the first video component but not the second video component) for longer than a threshold period of time, such as longer than five seconds or longer than ten seconds. The client device or the network may make this determination. Where the client device makes this determination, the client device may send an indication to the network upon determining that the client device is no longer consuming 3D content. Or, to keep a 3D content stream going, the client device may need to periodically (e.g., every minute or every five minutes) check in with the network such as by sending a signal to the VDU 101 indicating that the client device desires to continue consuming the 3D content. In the absence of receiving the signal as scheduled from at least one of the client devices for a given item of 3D content, the process may move to step 1104.

Where the network makes this determination, a heartbeat signal generated, for instance, by processing center 304 (and more particularly, such as by VDU 101) may repeatedly ping some or all of the client devices. For a given client device, the heartbeat signal may be sent on a regular periodic basis (e.g., every minute or every five minutes), or on an irregular basis such as on a bandwidth-available basis. In response to each heartbeat signal, each client device may indicate to the network (e.g., to VDU 101) a current status of the client device, such as to what streams the client device is currently tuned and/or what tuning commands have been issued by the user of the client device. This may allow the network to determine, for each client device, whether the client device is still consuming the same content it was consuming as of the previous heartbeat signal.

In response to detecting client device 201 tuning away or otherwise no longer consuming 3D content, at step 1102 data distribution or access network 300 (e.g., processing center 304 and/or VDU 101) may determine whether there are any clients in that same client device group that is currently consuming both video components of the 3D content item. If so, then at step 1103 the first and second video components may continue to be sent to the client device group as before, such as by VDU 101. If not, then at step 1104 data distribution or access network 300 (e.g., processing center 304 and/or VDU 101) may determine whether there are any other clients in that same client device group that are tuned to the 3D content item but only consuming the first video component (i.e., only consuming the 2D version of the content item). If so, then at step 1105 only the second video component is stopped from being further sent, and the first video component is continued to be sent by VDU 101, to that client device group. If not, then at step 1106 VDU 101 may stop sending both the first and second video components to that client device group. Whether or not certain video components are continued to be sent to a particular client device group may have no bearing on whether those video components are also continued to be sent to another client device group.

In addition, if just prior to step 1103 there are first and second audio tracks and/or first and second subtitle data being sent, then those may continue to be sent to the client device group. And, if just prior to step 1104 there are first and second audio tracks and/or first and second subtitle data being sent, then the second audio track and/or the second subtitle data would no longer be sent, while the first audio track and/or the second subtitle data would continue to be sent, to the client device group.

Thus, a way to efficiently provide 2D and 3D versions of multimedia content over a network to a plurality of client devices has been described. Where no client device in a client device group has selected a 3D version of the content, then only the 2D version may be sent to the client device group as needed. If at least one client device in the client device group has selected a 3D version of the content, then the 3D version may be sent to the entire client device group in a manner that still allows 2D-enabled client devices to consume the 2D version of the content. While illustrative systems and methods as described herein embodying various aspects of the present disclosure are shown, it will be understood by those skilled in the art that the disclosure is not limited to these embodiments. Modifications may be made by those skilled in the art, particularly in light of the foregoing teachings. For example, each of the features of the aforementioned illustrative examples may be utilized alone or in combination or subcombination with elements of the other examples. For instance, one of ordinary skill in the art will appreciate that the flowchart steps illustrated in the illustrative figures may be performed in other than the recited order, and that one or more blocks or steps illustrated in any of the figures may be optional in accordance with aspects of the disclosure. The description is thus to be regarded as illustrative of, rather than restrictive on, the present disclosure.

The invention claimed is:

1. A method comprising:
   transmitting, by a computing device to a plurality of client devices, a first portion of multimedia content, wherein the first portion of the multimedia content is in a first format;
   receiving, by the computing device and from each respective client device of the plurality of client devices, information indicating a current status of each of the respective client devices;
   determining, based on the received information, that a first subset of the plurality of client devices is expected to play a second portion of the multimedia content in a second format and that a second subset of the plurality of client devices is not expected to play the second portion of the multimedia content; and
   in response to determining that the first subset of client devices of the plurality of client devices is expected to play the second portion of the multimedia content in the second format:
      transmitting the second portion of the multimedia content in the second format to each of the plurality of client devices, wherein the second portion of the multimedia content in the second format is transmitted to each of the plurality of client devices despite the received information indicating that the second subset of the plurality of client devices is not expected to play the second portion of the multimedia content in the second format.

2. The method of claim 1, wherein the first format differs from the second format in at least one of resolution, screen size, or frame rate.

3. The method of claim 1, wherein each of the plurality of client devices is included in a group of devices located in a same geographical region.

4. The method of claim 1, further comprising:
   transmitting subtitle data to the plurality of client devices while the first portion of the multimedia content is being transmitted but not while the second portion of the multimedia content is being transmitted.

5. The method of claim 1, wherein the first portion of multimedia content is transmitted in a first stream, and the second portion of multimedia content is transmitted in a second stream different from the first stream and in a same frequency band as the first stream.

6. The method of claim 1, wherein the first portion of multimedia content is a first two-dimensional video component, the second portion of multimedia content is a second two-dimensional video component, and the multimedia content is three-dimensional multimedia content.

7. The method of claim 6, wherein the first two-dimensional video component is one of a left video component of the three-dimensional multimedia content and a right video component of the three-dimensional multimedia content, and the second two-dimensional video component is an other of the left video component and the right video component.

8. The method of claim 1, further comprising:
   transmitting, periodically or on a bandwidth-available basis, a heartbeat signal to each of the plurality of client devices;
   wherein the information indicating the current status of each of the plurality of client devices is received by the computing device from the plurality of client devices in response to the heartbeat signal.

9. The method of claim 1, wherein:
   determining, based on the received information, that the first subset of the plurality of client devices is expected to play the second portion of the multimedia content in the second format comprises determining that respective profiles of one or more client devices of the first subset indicate a preference for the second portion of the multimedia content in the second format; and determining, based on the received information, that the second subset of the plurality of client devices is not expected to play the second portion of the multimedia content in the second format comprises determining that respective profiles of one or more client devices of the second subset do not indicate a preference for multimedia content in the second format.

10. The method of claim 1, wherein:

determining, based on the received information, that the first subset of the plurality of client devices is expected to play the second portion of the multimedia content in the second format comprises determining that one or more client devices of the first subset are compatible with multimedia content in the second format; and determining, based on the received information, that the second subset of the plurality of client devices is not expected to play the second portion of the multimedia content in the second format comprises determining that one or more client devices of the second subset are not compatible with multimedia content in the second format.

11. A system comprising:

communication circuitry configured to:

transmit, to a plurality of client devices, a first portion of multimedia content, wherein the first portion of the multimedia content is in a first format; and receive, from each respective client device of the plurality of client devices, information indicating a current status of each of the respective client devices;

control circuitry configured to:

determine, based on the received information, that a first subset of the plurality of client devices is expected to play a second portion of the multimedia content in a second format and that a second subset of the plurality of client devices is not expected to play the second portion of the multimedia content;

wherein the communication circuitry is further configured to:

in response to determining that the first subset of client devices of the plurality of client devices is expected to play the second portion of the multimedia content in the second format:

transmit the second portion of the multimedia content in the second format to each of the plurality of client devices, wherein the second portion of the multimedia content in the second format is transmitted to each of the plurality of client devices despite the received information indicating that the second subset of the plurality of client devices is not expected to play the second portion of the multimedia content in the second format.

12. The system of claim 11, wherein the first format differs from the second format in at least one of resolution, screen size, or frame rate.

13. The system of claim 11, wherein each of the plurality of client devices is included in a group of devices located in a same geographical region.

14. The system of claim 11, wherein the communication circuitry is further configured to:

transmit subtitle data to the plurality of client devices while the first portion of the multimedia content is being transmitted but not while the second portion of the multimedia content is being transmitted.

15. The system of claim 11, wherein the communication circuitry is further configured to:

transmit the first portion of multimedia content in a first stream; and transmit the second portion of multimedia content in a second stream different from the first stream and in a same frequency band as the first stream.

16. The system of claim 11, wherein the first portion of multimedia content is a first two-dimensional video component, the second portion of multimedia content is a second two-dimensional video component, and the multimedia content is three-dimensional multimedia content.

17. The system of claim 16, wherein the first two-dimensional video component is one of a left video component of the three-dimensional multimedia content and a right video component of the three-dimensional multimedia content, and the second two-dimensional video component is an other of the left video component and the right video component.

18. The system of claim 11, wherein the communication circuitry is further configured to:

transmit, periodically or on a bandwidth-available basis, a heartbeat signal to each of the plurality of client devices;

wherein the information indicating the current status of each of the plurality of client devices is received from the plurality of client devices in response to the heartbeat signal.

19. The system of claim 11, wherein the control circuitry is configured to:

determine, based on the received information, that the first subset of the plurality of client devices is expected to play the second portion of the multimedia content in the second format by determining that respective profiles of one or more client devices of the first subset indicate a preference for the second portion of the multimedia content in the second format; and determine, based on the received information, that the second subset of the plurality of client devices is not expected to play the second portion of the multimedia content in the second format by determining that respective profiles of one or more client devices of the second subset do not indicate a preference for multimedia content in the second format.

20. The system of claim 11, wherein the control circuitry is configured to:

determine, based on the received information, that the first subset of the plurality of client devices is expected to play the second portion of the multimedia content in the second format by determining that one or more client devices of the first subset are compatible with multimedia content in the second format; and determine, based on the received information, that the second subset of the plurality of client devices is not expected to play the second portion of the multimedia content in the second format by determining that one or more client devices of the second subset are not compatible with multimedia content in the second format.

* * * * *